US012623476B2

(12) United States Patent
Amada et al.

(10) Patent No.: US 12,623,476 B2
(45) Date of Patent: May 12, 2026

(54) PRINTER ROLLER CLEANING SHEETS AND METHOD OF USE THEREOF

(71) Applicant: NCR Voyix Corporation, Atlanta, GA (US)

(72) Inventors: Janry Amada, Kabankalan City (PH); Jayzel Carcedo, Cebu City (PH); Ralph Waldo Tampus Pino, Cebu (PH); John Nicko Villacencio, Cebu City (PH)

(73) Assignee: NCR Voyix Corporation, Atlanta, GA (US)

( * ) Notice: Subject to any disclaimer, the term of this patent is extended or adjusted under 35 U.S.C. 154(b) by 210 days.

(21) Appl. No.: 18/216,817

(22) Filed: Jun. 30, 2023

(65) Prior Publication Data

US 2025/0001780 A1 Jan. 2, 2025

(51) Int. Cl.
*B41J 29/17* (2006.01)
*D04H 1/425* (2012.01)
*D04H 1/55* (2012.01)

(52) U.S. Cl.
CPC .............. *B41J 29/17* (2013.01); *D04H 1/425* (2013.01); *D04H 1/55* (2013.01)

(58) Field of Classification Search
CPC ............ B41J 29/17; D04H 1/425; D04H 1/55
See application file for complete search history.

(56) References Cited

U.S. PATENT DOCUMENTS 6,271,872 B1 * 8/2001 Nagata .................. B41J 11/666 347/171
2002/0112300 A1 * 8/2002 Muhr-Sweeney ........ B32B 7/05 15/210.1
2019/0217645 A1 * 7/2019 Campbell ............ B41J 11/0015

* cited by examiner

*Primary Examiner* — Jason S Uhlenhake
(74) *Attorney, Agent, or Firm* — Notaro, Michalos & Zaccaria P.C.

(57) ABSTRACT

In some implementations, printer roller cleaning sheets may include a nonwoven fabric having a blend of polyester fibers and cellulose fibers, the nonwoven fabric being in the form of a continuous sheet wound around a core, the nonwoven fabric designed and configured to effectively remove debris from printer rollers, the roll of polyester cellulose material configured to replace a roll of paper in the printer in order to perform a cleaning function of the one or more printer rollers.

1 Claim, 3 Drawing Sheets

PRINTER ROLLER CLEANING SHEETS AND METHOD OF USE THEREOF

FIELD

This disclosure relates generally to printer roller cleaning sheets and a method of use thereof, and more particularly to printer roller cleaning sheets adapted for use in different ways to clean thermal printer rollers.

BACKGROUND

One of the most common causes of paper feed problems in a printer (e.g., a thermal printer) is a dirty roller. The roller is responsible for pulling the paper through the printer, and when not clean, the roller may not be able to grip the paper correctly, causing the paper to slip, bunch up, or feed at an angle, which can lead to paper jams. Silicon cleaning pens are often used to clean a print roller in a thermal printer, but this must be done on a regular basis (e.g., monthly). For printers mounted in remote locations, such as within a self-service terminal, this necessitates regular service calls for cleaning. When the printer is remotely installed, such as in a self-service terminal, it becomes even more important to regularly clean the printer roller, because a paper jam can cause the self-service terminal to go out of service until an expedited (and potentially costly) service call is arranged to clear the paper jam. Thermal printers of the type used in self-service terminals can be more likely to experience paper jams caused by dirty rollers because the paper is typically fed from a roll of paper and cut with an internal cutter to generate a transaction receipt, for example. The process of cutting the paper can generate internal dust and other paper residue that can accumulate on the printer roller, which over time can reduce the effectiveness of the printer roller.

Accordingly, there is a need for an improved way to clean the roller of the printer, particularly a remotely-located printer, in order to preclude paper jams that could require costly service calls to resolve.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
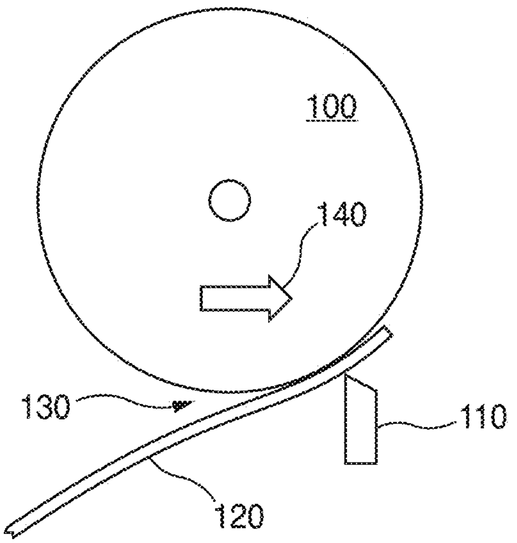
FIG. 1 is diagram showing the operation of a printer roller in a clean condition.

Referring now to FIG. 1, when paper 120 (either in sheet form or from a roll of paper not shown) is fed to a printer roller 100 which rotates in the direction shown by arrow 140, the paper 120 typically adheres to the outer surface of the printer roller 100, allowing the roller to pull the paper 120 along. For some printers, such as thermal printers used in self-service terminals, a cutter 110 is typically positioned adjacent to the printer roller 100 in order to cut the paper 120 at an appropriate position. This is typically done in a self-service terminal to provide a user thereof with a paper receipt recording the results of a transaction at the self-service terminal. The printer roller 100 must be relatively clear of dust, paper debris, ink residue, and/or other contaminants (collectively "debris") in order for the paper 120 to properly adhere to the roller 100, particularly in and around the area of contact 130 between the paper 120 and the roller 100.

Figure 2:
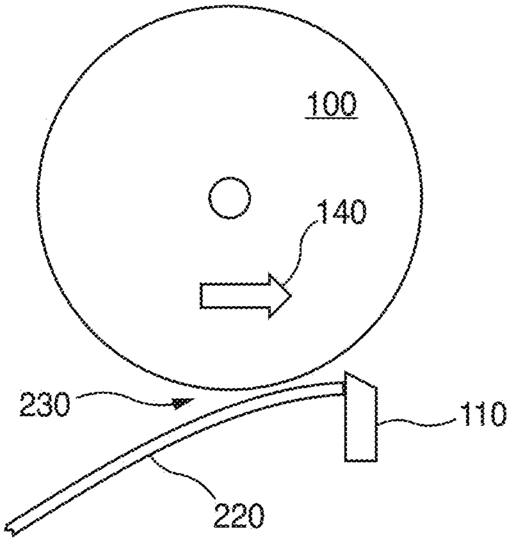
FIG. 2, is a diagram showing the operation of a printer roller in a clean condition.

Referring now to FIG. 2, when paper 220 (either in sheet form or from a roll of paper not shown) is fed to the printer roller 100 when dust and paper debris are present on the printer roller 100 in and around the area of contact 230 between the paper 220 and the roller 100, the paper 220 may not adhere to the roller 100 and may instead strike cutter 110 (or other structures within the associated printer that are located adjacent to the printer roller 100), thereby causing a jam. When printer roller 100 is part of a printer incorporated into a self-service terminal, this type of printer jam can result in the need to schedule a potentially costly service call and may cause the self-service terminal to go off-line until the jam is resolved.

Polyester cellulose wipes, also known as polyester/cellulose nonwoven wipes, are a type of cleaning wipe or cloth that is commonly used in various industries, including healthcare, electronics, and manufacturing. These wipes can be provided in sheet form and are composed of a blend of polyester fibers and cellulose fibers. Polyester is a synthetic fiber known for its durability, strength, and resistance to chemicals. It provides the wipe with enhanced abrasion resistance, making it suitable for more rigorous cleaning tasks. Polyester fibers also offer good absorbency, allowing the wipe to soak up liquids effectively. Cellulose, on the other hand, is a natural fiber derived from plant sources, such as wood pulp. It provides the wipe with softness and improved absorbency. Cellulose fibers can hold and retain liquids, making them effective for wiping surfaces and absorbing spills. The combination of polyester and cellulose fibers in these wipes results in a material that combines the benefits of both. Polyester cellulose wipes are typically low-linting, meaning they shed minimal fibers during use, which is especially important in applications where cleanliness and particulate control are crucial, such as in cleanrooms or electronics manufacturing. These wipes are available in various sizes and forms, such as rolls, sheets, or pre-cut pieces, to accommodate different cleaning needs.

The present inventors have found that a sheet of polyester cellulose material is extremely effective at cleaning printer rollers and thereby preventing the accumulation of dust and paper debris on printer rollers in order to prevent jams and other paper feed problems. Because polyester cellulose material is low linting, there is almost no shedding of fibers or other debris. This makes polyester cellulose material an optimal material for use in cleaning a printer roller. By passing a sheet of polyester cellulose material through the printer paper path, any dust and paper debris that may have accumulated on the printer roller will adhere to the fibrous surface of the ## #polyester cellulose sheet and pass out of the printer. This material has been found to be very effective for cleaning a printer roller since its lint-free nature ensures that all of the dust and debris accumulated on the printer roller can be removed with no remnants whatsoever from the material. Because polyester cellulose material can easily be formed into sheets or rolls like paper and with the same size and form, it is an ideal solution for cleaning printer rollers.

Figure 3:
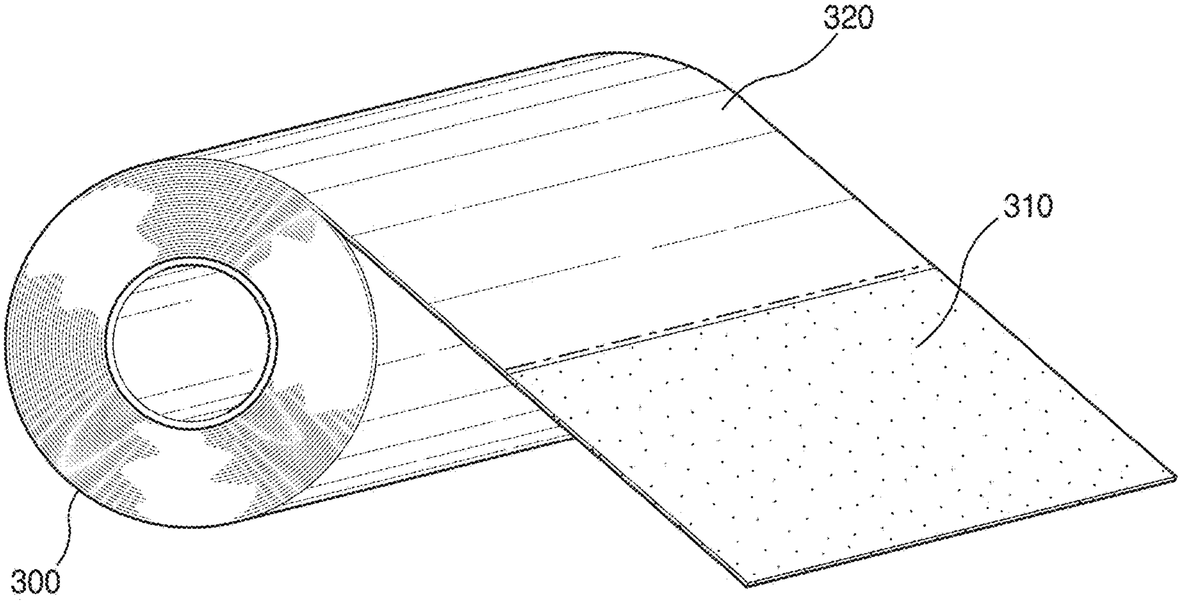
FIG. 3 is a diagram of a roll of paper with a cleaning sheet for use in cleaning a printer roller according to one aspect of the present disclosure.

Referring now to FIG. 3, the polyester cellulose material may be provided as a roll 300 that fits in place of a paper roll for a printer. Someone servicing the printer will install the roll 300, e.g., during a service call, and then operate the printer to pass at least a first portion 310 through the printer roller in order to clean the surface of the printer roller. Alternatively, the roll 300 may consist of two parts, with the first portion 310 composed of polyester cellulose material coupled (bound) to and wound over a second portion 320 formed from normal printer paper. In this way, the printer roller can be regularly cleaned every time the roll of paper for the printer is replaced by installing the paper roll 300 and operating the printer to pass the first portion of the roll 300 through the printer roller.

Figure 4:
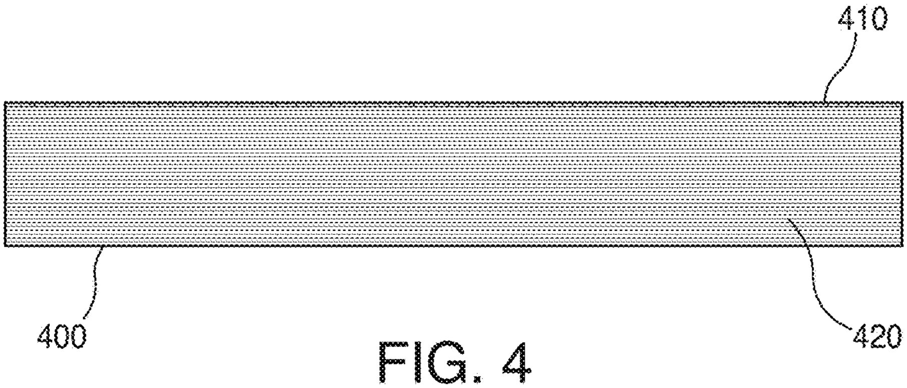
FIG. 4 is a diagram of a ream of paper with a cleaning sheet for use in cleaning a printer roller according to another aspect of the present disclosure.

Thermal printers typically use rolls of paper, as discussed herein. Many other types of printers use rollers as part of a feeding process for sheets of paper from a ream of paper. All of these printers can be subject to similar print jams due to dirty rollers. Referring now to FIG. 4, a ream 400 of paper may consist of a stack of normal printer paper 420 with a sheet of polyester cellulose material provided as a sheet 410. A user will install some or all of the paper 420 within the ream 400 along with the sheet 410 in their printer in order to clean the internal printer roller (or rollers) whenever a new ream 400 of paper is opened. Alternatively, the ream 400 may consist entirely of sheets of polyester cellulose material and a user may choose to install one or more of such sheets in the printer, depending on how dirty the roller is.

Figure 5:
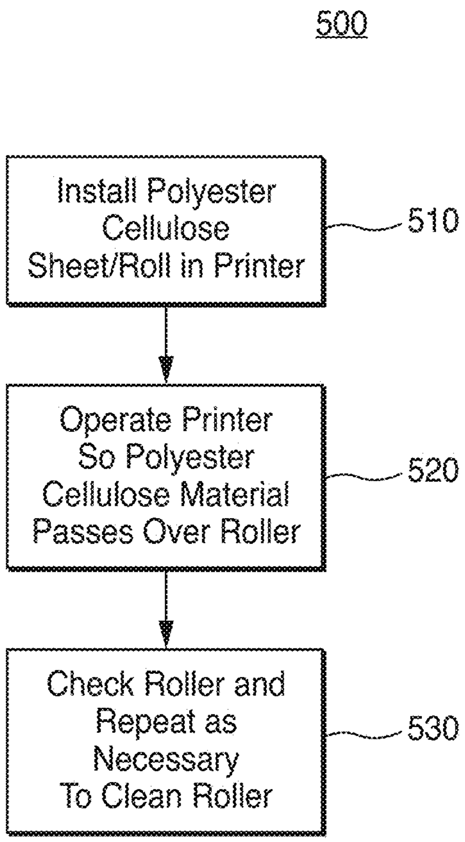
FIG. 5 is a flowchart of a method of cleaning a printer roller according to the present disclosure.

Referring now to the flowchart 500 of FIG. 5, the process of cleaning the printer involves the following steps. Step (1) (which corresponds to step 510 of the flowchart 500) includes installing polyester cellulose material sheet into the printer. This may be done by installing a complete roll polyester cellulose material into a thermal printer, by installing a mixed roll of polyester cellulose material and regular printer paper into the thermal printer, or by installing a sheet of polyester cellulose material with regular paper into a printer that prints to stacked paper. Step (2) (which corresponds to step 520 of the flowchart 500) includes operating the printer so that the polyester cellulose material passes through the printer roller or rollers. Step (3) (which corresponds to step 530 of the flowchart 500) includes repeating as necessary until the printer roller is clean.

The method of this disclosure is very quick, inexpensive, and effective in keeping printer rollers clean and clear of dust and paper debris. When used regularly with thermal printers at self-service terminals, costly shutdowns and service calls are avoided.

The printer roller cleaning sheets may be provided as a roll of polyester cellulose material for use in cleaning one or more printer rollers in a printer. Such a roll may be a nonwoven fabric having a blend of polyester fibers and cellulose fibers. The nonwoven fabric may be in the form of a continuous sheet wound around a core. The nonwoven fabric may be designed and configured to effectively remove debris from printer rollers. The roll of polyester cellulose material may be configured to replace a roll of paper in the printer in order to perform a cleaning function of the one or more printer rollers.

In one alternative, the printer roller cleaning sheets may be provided as a combined roll of printer paper and polyester cellulose material for use in cleaning one or more printer rollers in a printer. The combined roll has a continuous sheet of printer paper wound around a core. The combined roll also has a nonwoven fabric having a blend of polyester fibers and cellulose fibers. The nonwoven fabric may be in the form of a continuous sheet coupled (bound) to and wound over the continuous sheet of printer paper. The nonwoven fabric may be designed and configured to effectively remove debris from printer rollers. The combined roll of polyester cellulose material may be configured to replace a roll of paper in the printer in order to perform a cleaning function of the one or more printer rollers upon an initial installation of the combined roll of polyester cellulose material into the printer.

In another alternative, the printer roller cleaning sheets may be provided as a polyester cellulose material for use in cleaning one or more printer rollers in a printer. The printer roller cleaning sheets may have a nonwoven fabric comprising a blend of polyester fibers and cellulose fibers. The nonwoven fabric may be in the form of separate sheets adapted to fit into a paper compartment of a printer. The nonwoven fabric may be designed and configured to effectively remove debris from printer rollers. The polyester cellulose material may be for cleaning the one or more printer rollers upon installation into the printer.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A cleaning roll for cleaning one or more printer rollers in a thermal printer, comprising:

a roll comprising a nonwoven fabric consisting of a blend of polyester fibers and cellulose fibers, wherein the nonwoven fabric comprises a continuous sheet wound around a core of the roll, wherein the roll is configured to replace a roll of paper in the thermal printer such that the thermal printer advances the continuous sheet through a paper path via a printer feed mechanism, and wherein the continuous sheet contacts the one or more printer rollers to remove debris adhered to the one or more printer rollers.

* * * * *